(12) United States Patent
Lee et al.

(10) Patent No.: US 11,143,912 B2
(45) Date of Patent: Oct. 12, 2021

(54) BACKLIGHT UNIT AND DISPLAY DEVICE INCLUDING THE SAME

(71) Applicant: LG DISPLAY CO., LTD, Seoul (KR)

(72) Inventors: Suhun Lee, Paju-si (KR); Donghwi Kim, Paju-si (KR)

(73) Assignee: LG DISPLAY CO., LTD, Seoul (KR)

( * ) Notice: Subject to any disclaimer, the term of this patent is extended or adjusted under 35 U.S.C. 154(b) by 0 days.

(21) Appl. No.: 16/939,686

(22) Filed: Jul. 27, 2020

(65) Prior Publication Data

US 2021/0033930 A1 Feb. 4, 2021

(30) Foreign Application Priority Data

Aug. 2, 2019 (KR) .......................... 10-2019-0094510

(51) Int. Cl.
*G02F 1/13357* (2006.01)
*G02F 1/1335* (2006.01)

(52) U.S. Cl.
CPC .. *G02F 1/133605* (2013.01); *G02F 1/133603* (2013.01); *G02F 1/133606* (2013.01); *G02F 1/133614* (2021.01)

(58) Field of Classification Search
None
See application file for complete search history.

(56) References Cited

U.S. PATENT DOCUMENTS

2018/0210129 A1* 7/2018 Uno ...................... G02B 6/0088
2021/0026203 A1* 1/2021 Kim .................. G02F 1/133603

* cited by examiner

*Primary Examiner* — Britt D Hanley
(74) *Attorney, Agent, or Firm* — Birch, Stewart, Kolasch & Birch, LLP

(57) ABSTRACT

Embodiments of the present disclosure provide a backlight unit comprising at least one light emitting unit emitting light in a first wavelength band, a phosphor film exciting the light in the first wavelength band emitted from the light emitting unit to emit the light in the first to a third wavelength bands, a first reflective film disposed in a position corresponding to a rim of the phosphor film and causing to reflect the light in the first wavelength band, a second reflective film disposed adjacent to the first reflective film and causing to reflect the light in the second and third wavelength bands, and a dam disposed around the light emitting unit. A display device using the backlight unit is also provided.

15 Claims, 17 Drawing Sheets

BACKLIGHT UNIT AND DISPLAY DEVICE INCLUDING THE SAME

CROSS REFERENCE TO RELATED APPLICATION

This application claims priority to the Korean Patent Application No. 10-2019-0094510, filed in the Republic of Korea on Aug. 2, 2019, which is hereby incorporated by reference for all purposes as if fully set forth herein into the present application.

BACKGROUND

Field

Embodiments of the present disclosure relate to a backlight unit and a display device including the same.

Description of Related Art

Along with the development of the information society, a demand for display devices for displaying images is more and more increasing in a variety of application fields. For a display device, various display devices such as e.g., liquid crystal displays (LCDs), organic light emitting displays (OLEDs), quantum dot light emitting displays (QLEDs), and so on are recently being utilized.

A liquid crystal display device of various flat-panel display devices typically utilizes a Light Emitting Diode (LED), a Cold Cathode Fluorescent Lamp (CCFL), a Hot Cathode Fluorescent Lamp (HCFL) and the like, as a light source for a backlight unit. In recent years, the light-emitting diodes having excellent light efficiency and better color reproducibility are in wide use as a light source for the backlight unit of the display device.

The backlight units can be classified into an edge-type, a direct-type and so on according to the arrangement of the light sources and the transmission mode of light. In the direct-type of backlight unit, among others, the light source such as, for example, an LED can be arranged on the back side of the display device.

BRIEF SUMMARY

Embodiments of the present disclosure provide a backlight unit capable of improving its image quality, and a display device using the same.

Embodiments of the present disclosure provide a backlight unit capable of implementing a narrow bezel, and a display device using the same.

According to an aspect of the present disclosure, provided is a backlight unit comprising a light emitting unit emitting light in a first wavelength band, a phosphor film excited by the light in the first wavelength band emitted from the light emitting unit to emit the light in the first to a third wavelength bands, a first reflective film disposed in a position corresponding to a rim of the phosphor film and causing to reflect the light in the first wavelength band, a second reflective film disposed in a position corresponding to an inner side of the phosphor film than the first reflective film and causing to reflect the light in the second and third wavelength bands, and a dam disposed around the light emitting unit.

According to another aspect of the present disclosure, provided is a display device comprising a display panel and a backlight unit irradiating onto the display panel, said backlight unit comprising a light emitting unit emitting light in a first wavelength band, a phosphor film excited by the light in the first wavelength band emitted from the light emitting unit to emit the light in the first to a third wavelength bands, a first reflective film disposed in a rim of the light emitting unit and causing to reflect the light in the first wavelength band, a second reflective film disposed in an inner side of the light emitting unit phosphor film than the first reflective film and causing to reflect the light in the second and third wavelength bands, and a dam disposed around the light emitting unit.

According to embodiments of the present disclosure, it is possible to provide a backlight unit capable of improving the image quality and a display device using the same.

Further, according to embodiments of the present disclosure, it is possible to provide a backlight unit capable of implementing a narrow bezel and a display device using the same.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION OF THE EMBODIMENTS

Figure 1:
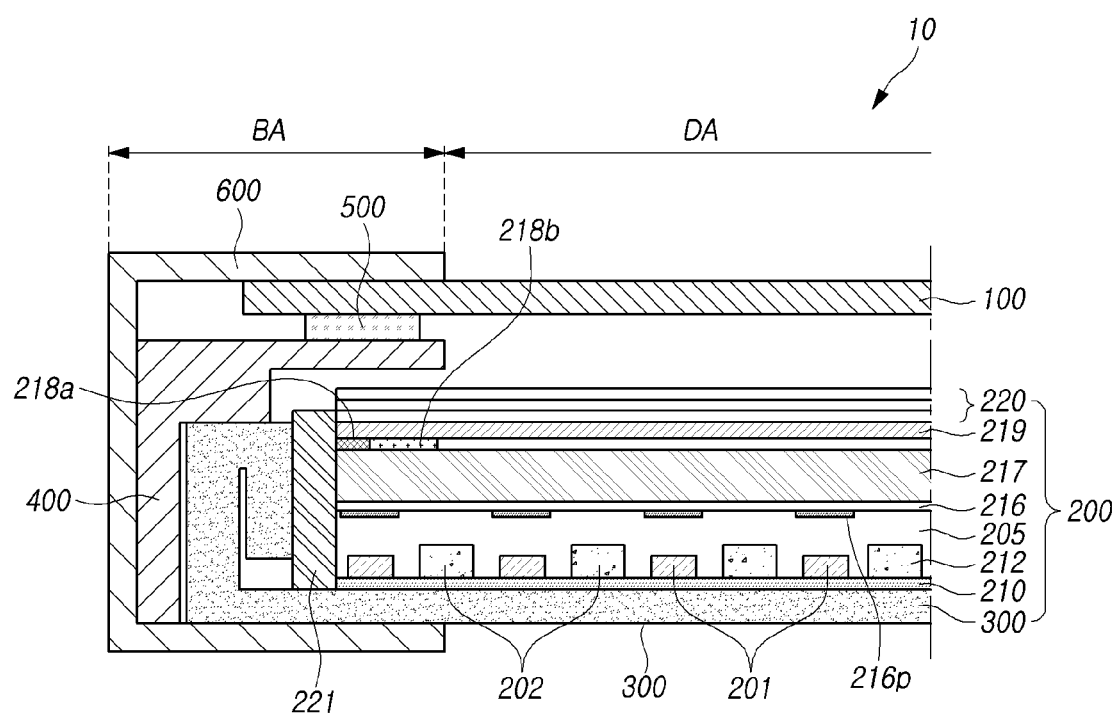
FIG. 1 is a cross-sectional view illustrating a preferred embodiment of a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description can make the subject matter in some embodiments of the present disclosure rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

Figure 2:
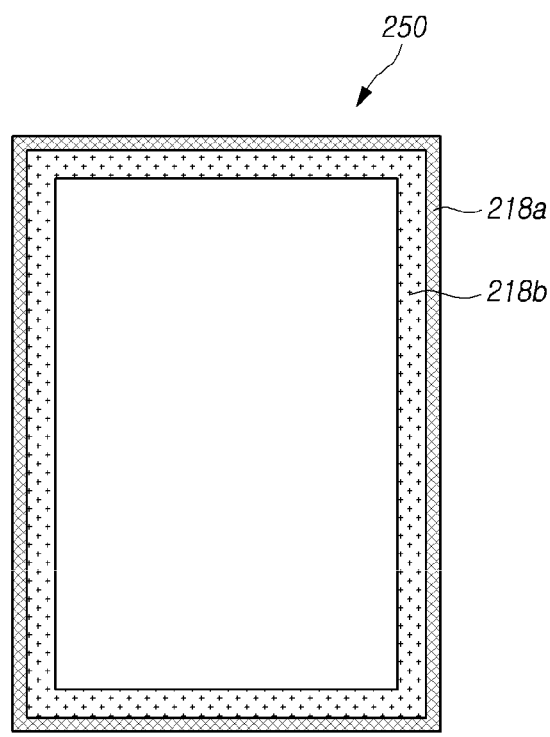
FIG. 2 is a plan view showing a light emitting unit according to embodiments of the present disclosure.

FIG. 1 is a cross-sectional view illustrating a preferred embodiment of a display device according to embodiments of the present disclosure, and FIG. 2 is a plan view showing a light emitting unit according to embodiments of the present disclosure. All the components of the display device according to all embodiments of the present disclosure are operatively coupled and configured.

Referring to FIGS. 1 and 2, a display device 10 can include a display panel 100 and a backlight unit 200

The display panel 100 is configured to display images. In case the display panel 100 is a liquid crystal panel, it can include a liquid crystal and a color filter.

The backlight unit 200 is configured to irradiate light onto the display panel 100. The backlight unit 200 can include a light emitting unit 250 for emitting light, a phosphor film 219 excited by the light irradiated from the light emitting unit 250 to make an output light, a first reflective film 218a disposed in a position corresponding to a rim of the phosphor film 219 to thereby reflect a first wavelength band of light (e.g., blue light), a second reflective film 218b disposed adjacent to the first reflective film 218a to thereby reflect a second wavelength band of light (e.g., green light) and a third wavelength band of light (e.g., red light), and a dam 221 disposed around the light emitting unit 250. Further, the second reflective film 218b can be disposed in an inner side of the phosphor film 219 than the first reflective film 218a.

The first reflective film 218a can transmit the second wavelength band of light and the third wavelength band of light, while the second reflective film 218b can transmit the first wavelength band of light. A reflection of light can denote a circumstance that the amount of reflected light is greater than the amount of transmitted light when the light is irradiated onto the first reflective film 218a or the second reflective film 218b. For example, such a reflection of light can denote a circumstance that about 90% of light irradiated from the first reflective film 218a or the second reflective film 218b is reflected and its remaining 10% is transmitted when the light is reflected.

The light emitting unit 250 can be configured to irradiate light in the first wavelength band. The phosphor film 219 can be excited by the light in the first wavelength band irradiated from the light emitting unit 250 to emit the light in the first to third wavelength bands. Hereinafter, the light in the first wavelength band, the light in the second wavelength band, and the light in the third wavelength band will be respectively referred to as blue light, green light, and red light, although it is not limited thereto.

The light emitting unit 250 can include a plurality of light emitting devices 201 disposed on a substrate 210, and is configured to irradiate the light emitted from the light emitting devices 201 onto the display panel 100. The light emitting device 201 can emit blue light, although it is not limited thereto.

The light emitting device 201 can include at least one light emitting diode. This light emitting device 201 can include a small sized light emitting diode (Mini LED) or a micro-sized light emitting diode (μLED). Further, the light emitting device 201 can be disposed in a form mounted on the substrate 210 with a chip-shaped structure, thereby enabling decrease in thickness of the backlight unit 200, and thus, providing a light source with a wider irradiation angle and higher light efficiency.

Further, the light emitting unit 250 can include at least one reflector 202 disposed on a partial surface area between the plurality of light emitting devices 201 on the substrate 210. The reflector 202 can be fixed onto the substrate 210 by means of an adhesive tape. When the light emitting device 201 is disposed with a chip shaped structure, the size of the light emitting device becomes relatively smaller, so that the height of the reflector 202 can be higher than the height of the light emitting device 201.

The substrate 210 on which the light emitting devices 201 and the reflectors 202 are disposed can be a printed circuit board. The backlight unit 200 can include a cover bottom 300 to accommodate optical elements constituting the backlight unit 200. Further, the substrate 210 can be disposed on the cover bottom 300. The cover bottom 300 can serve to protect a rear surface of the substrate 210 and radiate heat generated from the light emitting device 201.

Then, the light emitting unit 250 can include a resin layer 205 disposed on the plurality of light emitting devices 201 and the reflectors 202. The resin layer 205 serves to protect the plurality of light emitting devices 201 disposed on the substrate 210 and can cause to undergo diffusion of the light emitted from the light emitting devices 201 to provide a function of a light guide plate. The light emitted from the light emitting device 201 can spread out as evenly as possible passing through the resin layer 205.

Further, the backlight unit 200 can include a light conversion sheet 216 disposed on the resin layer 205. The light conversion sheet 216 can cause to undergo scattering, reflection, or diffraction of the light irradiated from the light emitting device 201. Further, the light conversion sheet 216 can transmit part of the light irradiated from the light emitting device 201. The light conversion sheet 216 can be a light control sheet that can transmit part of the irradiated light. The light conversion sheet 216 can include a plurality of light conversion patterns 216p, and the plurality of light conversion patterns 216p can be disposed to overlap each of the plurality of light emitting devices 201.

The light conversion pattern 216p can be arranged in a position corresponding to each of the plurality of light emitting devices 201, causing to scatter, reflect, and/or diffract the light irradiated from each light emitting device 201. The light conversion pattern 216p can transmit part of the light emitted from the light emitting device 201. The light conversion pattern 216p can be a light control pattern capable of transmitting part of the irradiated light. By arranging the light conversion pattern 216p in an area having the strongest intensity of the light emitted from the light emitting device 201, it is possible to reduce the luminance deviation between the area in which the light emitting device 201 is disposed (i.e., the area having a large amount of light) and the area between the light emitting devices 201 (i.e., the area having a small amount of light). Further, the light conversion sheet 216 can include a light conversion material. The light conversion pattern 216p of the light conversion sheet 216 can include a light conversion material. The light conversion material can include titanium dioxide ($TiO_2$). In addition, the light conversion material can be white, although it is not limited thereto.

Thus, by reducing the luminance deviation by the light conversion sheet 216, it possible to suppress occurrence of a smear defect (also known as "mura" in Japanese), such as a non-uniform and stained display screen, in some fringe area of the light emitting devices 201 in the backlight unit 200. Hence, the luminance of light emitted from the backlight unit 200 can be made more uniform.

Further, the backlight unit 200 can include a diffuser plate 217 disposed on the light conversion sheet 216. The diffuser plate 217 can diffuse the incident light emitted from the light emitting device 201.

The backlight unit 200 can include a phosphor film 219 disposed on the diffuser plate 217. The phosphor film 219 can be excited by blue light emitted from the light emitting device 201 to output white light. Further, the backlight unit 200 can include an optical sheet 220 disposed on the phosphor film 219. The optical sheet 220 can collect or diffuse the light to be transmitted to the display panel 100, and the optical sheet 220 can include a light collecting sheet and a diffusion sheet.

Further, the first reflective film 218a and the second reflective film 218b can be disposed between the light emitting unit 250 and the phosphor film 219. The first reflective film 218a and the second reflective film 218b can have a structure in which a plurality of thin films having different refractive indices are stacked. For example, the first reflective film 218a and the second reflective film 218b can have the structure that a thin film with a refractive index of n1 and another thin film with a different refractive index of n2 are alternately stacked on each other. The first reflective film 218a and the second reflective film 218b can have different thicknesses from each other. The thickness of the first reflective film 218a and the second reflective film 218b can be determined by the number of stacked thin films and/or the thickness of the thin films.

The wavelengths of light reflected from the first reflective film 218a and the second reflective film 218b can be determined in correspondence to the thicknesses of the first reflective film 218a and the second reflective film 218b. Further, the width of the second reflective film 218b can be wider than that of the first reflective film 218a. The first reflective film 218a can cause reflection of blue light and the second reflective film 218b can cause reflection of red light and/or green light, although not limited thereto.

The backlight unit 200 can include a dam 221 disposed around the light emitting unit 250. The dam 221 can reflect the light emitted from the light emitting unit 250 to advance it in the direction of the phosphor film 219. Hence, the light efficiency of the light emitting unit 250 can be further increased. Preferably, the dam 221 can be coated with a reflective film, to which dam a white pigment can be applied. The dam 221 can be disposed on the substrate 210 and it can be preferably fixed to the substrate 210 by an adhesive tape.

The display device 10 can further include various structural elements disposed between the backlight unit 200 and the display panel 100, such as, e.g., a guide panel 400 and a foam pad 500. The display panel 100 can be fixed onto the backlight unit 200 by the guide panel 400 and the foam pad 500.

Then, the display device 10 can include a bezel 600 disposed on its rim, wherein an elongated area in which the bezel 600 is disposed on the display device 10 can be referred to as a bezel area BA, and the other area in which the bezel 600 is not disposed to expose the display panel 100 can be referred to as a display area DA. The bezel 600 can be disposed to cover the dam 221 disposed at the bottom, and the guide panel 400, although those elements covered by the bezel 600 are not limited thereto. In addition, the first reflective film 218a and the second reflective film 218b can be disposed in the bezel area BA.

Figure 3:
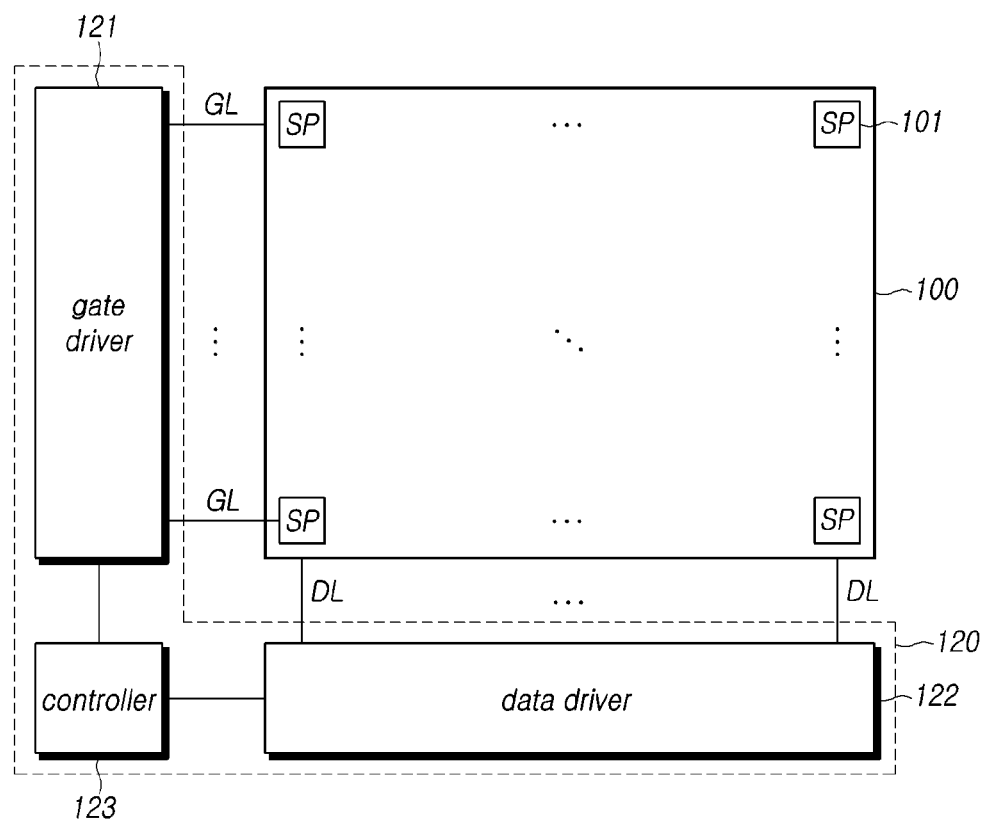
FIG. 3 is a structural diagram showing a display panel and a driving circuit for driving the display panel according to embodiments of the present disclosure.

FIG. 3 is a schematic diagram showing the structure of the display panel and a driving circuit for driving the display panel according to embodiments of the present disclosure.

Referring now to FIG. 3, the display panel 100 is configured to display images, and the driving circuit 120 for driving the display panel 100 is configured to transmit one or more signals and/or voltages to the display panel 100 to have the images displayed thereon. The driving circuit 120 can further include a gate driver 121, a data driver 122 and a controller 123.

The display panel 100 can include a plurality of gate lines GL and a plurality of data lines DL. The display panel 100 can include at least one subpixel 101 connected to the gate line GL and the data line DL. Further, in case where the display panel 100 is a liquid crystal panel, the display panel 100 can include a pixel electrode, a common electrode, and a liquid crystal layer disposed between the pixel electrode and the common electrode. The liquid crystal layer is adapted to enable displaying of the images by allowing its molecular arrangement to change in response to voltages applied to the pixel electrode and the common electrode so as to block or transmit the light through the layer.

The gate driver 121, controlled by the controller 123, can make a control of the driving timing of the plurality of subpixels 101 by sequentially outputting a scan signal to the plurality of gate lines GL arranged on the display panel 100. The gate driver 121 can include one or more gate driver integrated circuits (GDICs), and can be disposed on either one side or both sides of the display panel 100 according to a driving scheme in use.

Each gate driver integrated circuit (GDIC) can be connected to a bonding pad of the display panel 100 by means of tape-automated bonding (TAB) or chip-on-glass (COG) method, or can be implemented with a gate-in-panel (GIP) type to be directly disposed on the display panel 100. In addition, each gate driver integrated circuit (GDIC) can be implemented with chip-on-film (COF) method, being mounted on a film connected to the display panel 100.

The data driver 122 is configured to receive image data from the controller 123 to convert the received image data into a series of analog data voltage. The data driver 122 is configured to output a data voltage to each data line DL in line with the timing at which the scan signal is applied through the gate line GL, so that each sub-pixel 101 can represent brightness according to the image data.

The data driver 122 can include one or more source driver integrated circuits (SDICs), and each source driver integrated circuit (SDIC) can include a shift register, a latch circuit, a digital-to-analog converter, and an output buffer, although not limited thereto.

Each source driver integrated circuit (SDIC) can be connected to the bonding pad of the display panel 100 by means of the tape automated bonding (TAB) or the chip-on-glass (COG) method, or can be directly disposed on the display panel 100. Further, each source driver integrated circuit (SDIC) can be implemented with the chip-on-film (COF) method, in which each source driver integrated circuit (SDIC) can be mounted on a film connected to the display panel 100 and be electrically connected to the display panel 100 through wirings on the film.

The controller 123 can be configured to supply various control signals to the gate driver 121 and the data driver 122, so as to control the operation of the gate driver 121 and the data driver 122. The controller 123 can be mounted on a printed circuit board, and can be electrically connected to the gate driver 121 and the data driver 122 through the printed circuit board. The controller 123 can be also configured to control the gate driver 121 to adaptively output the scan signal according to the operational timing to be implemented in each frame.

Further, the controller 123 can be configured to convert externally received image data in compliance with a data signal format used by the data driver 122 and then, output the converted image data to the data driver 122. The controller 123 can be configured to receive from an external source (e.g., a host system) various timing signals including e.g., a vertical sync signal VSYNC, a horizontal sync signal HSYNC, an input data enable signal DE, and a clock signal CLK, together with image data.

Then, the controller 123 can be configured to generate various control signals using the various timing signals transmitted from the outside to output the same to the gate driver 121 and the data driver 122. For example, in order to control the gate driver 121, the controller 123 can be configured to provide a variety of gate control signal (GCS) inclusive of e.g., a gate start pulse (GSP), a gate shift clock (GSC), a gate output enable signal (GOE), and so on. Here, the gate start pulse (GSP) can control the operation start timing of one or more gate driver integrated circuits (GDICs) constituting the gate driver 121.

The gate shift clock (GSC) can be a clock signal commonly input to one or more gate driver integrated circuits (GDICs), for controlling the shift timing of the scan signal.

The gate output enable signal (GOE) can specify the timing information of one or more gate driver integrated circuits (GDICs).

Furthermore, in order to control the data driver 122, the controller 123 can be configured to output various data control signal (DCS) inclusive of, e.g., a source start pulse (SSP), a source sampling clock (SSC), a source output enable signal (SOE), and so on. Here, the source start pulse (SSP) can be adapted to control the data sampling start timing of one or more source driver integrated circuits (SDICs) constituting the data driver 122. The source sampling clock (SSC) can be a clock signal to control the data sampling timing in each of the source driver integrated circuits SDIC. Further, the source output enable signal (SOE) can be adapted to control the output timing of the data driver 122.

In addition, the driving circuit 120 can include a power management integrated circuit for supplying various voltages and/or currents to the display panel 100, the gate driver 121, the data driver 122, the controller 123 and others, or controlling those various voltages or currents to be supplied thereto.

Figure 4:
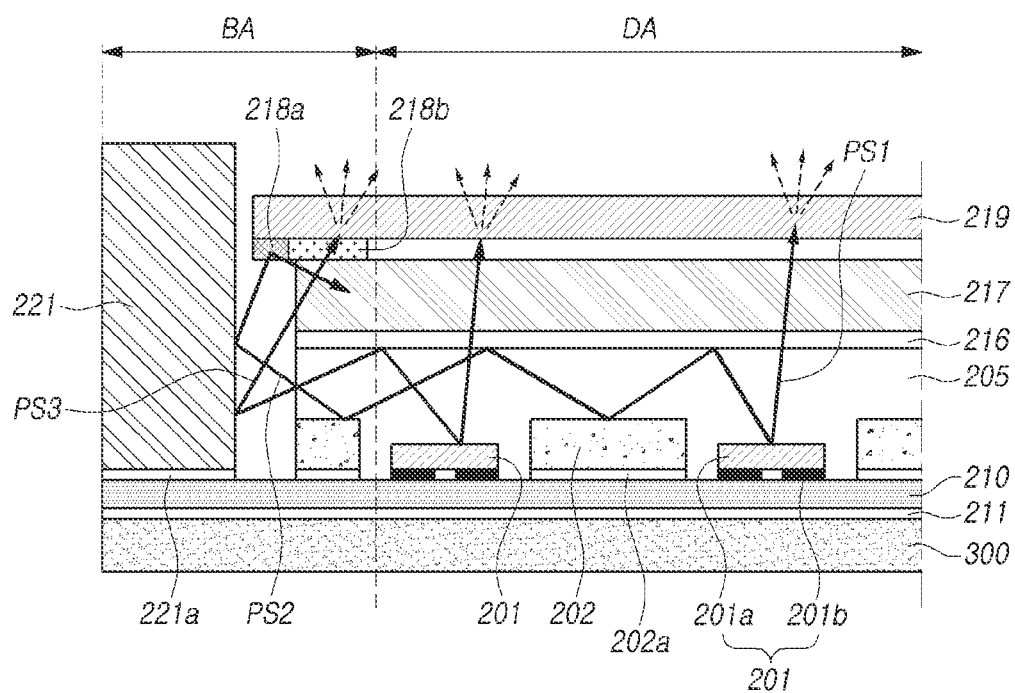
FIG. 4 is a conceptual diagram illustrating how the light emitted from a light emitting device is transmitted to a phosphor film.
Figure 5:
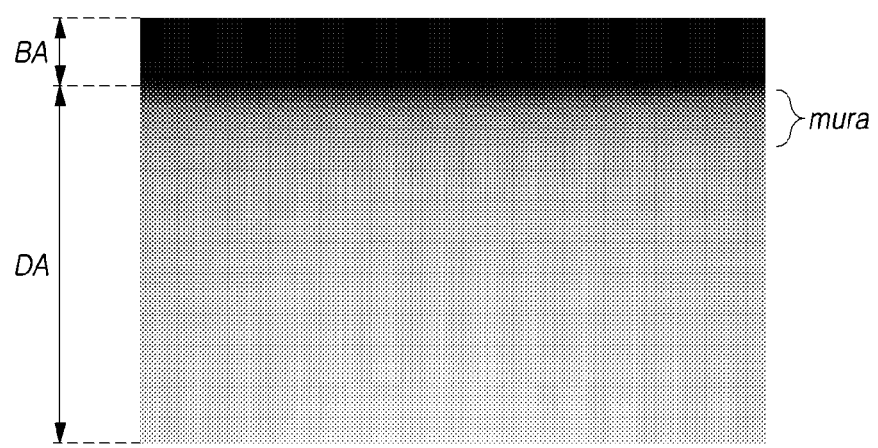
FIG. 5 is a plan view showing an example of a light emission state of a light emitting unit without a first reflective film and a second reflective film included.
Figure 6:
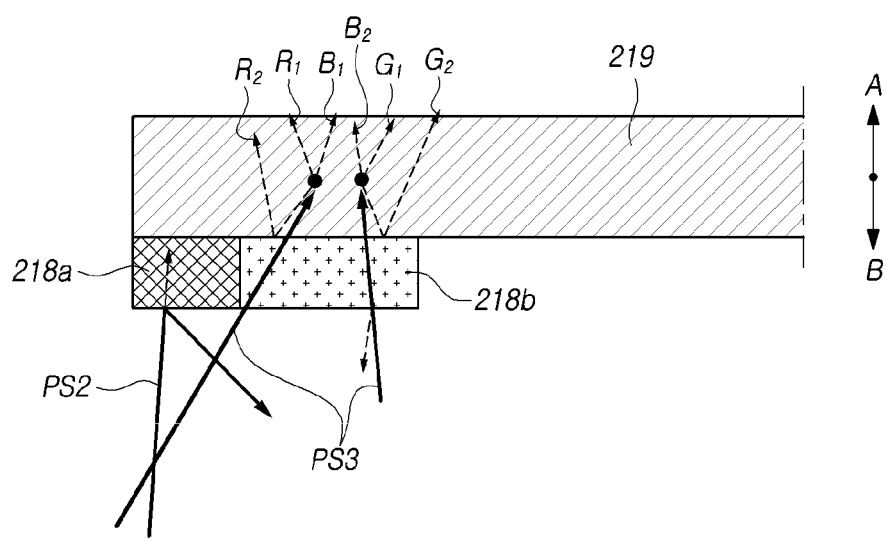
FIG. 6 is a conceptual diagram showing a path of the light traveling in a phosphor film in a structure that the first reflective film and the second reflective film are disposed underneath a phosphor film.
Figure 7:
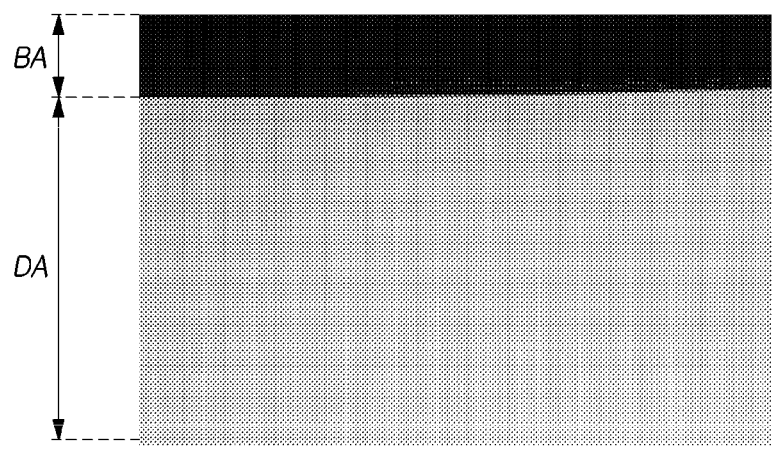
FIG. 7 is a plan view showing an example of a light emission state of the light emitting unit with the first reflective film and the second reflective film included.
Figure 8:
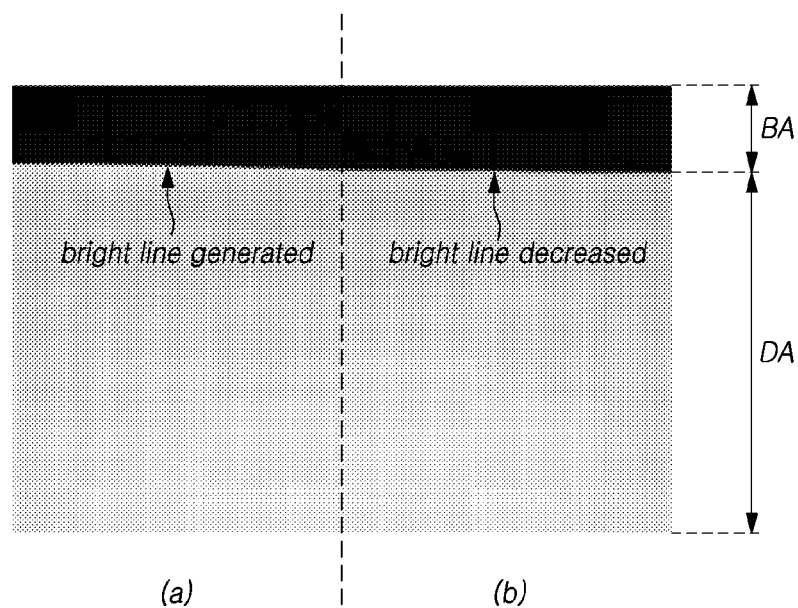
FIG. 8 is a view illustrating a result of comparing a light emission state of the light emitting units according to the positions of the first and second reflective films.

FIG. 4 is a conceptual diagram illustrating how the light emitted from the light emitting device is transmitted to the phosphor film, and FIG. 5 is a plan view showing an example of a light emission state of the light emitting unit without the first reflective film and the second reflective film included. Further, FIG. 6 is a conceptual diagram showing a path of the light traveling in the phosphor film in a structure that the first reflective film and the second reflective film are disposed underneath the phosphor film, and FIG. 7 is a plan view showing an example of a light emission state of the light emitting unit with the first reflective film and the second reflective film included. Furthermore, FIG. 8 is a view illustrating a result of comparing a light emission state of the light emitting units according to the positions of the first and second reflective films.

Referring now to FIGS. 4 to 8, the light emitted from the light emitting device 201 of the backlight unit 200 can proceed in a first path PS1 extending towards the top side, and a second path (PS2) or a third path (PS3) extending alongside the backlight unit 200, although the paths of the light emitted from the light emitting device 201 are not limited thereto.

The light emitting device 201 can include a light emitting diode 201a, wherein an electrode 201b can be disposed on the substrate 210 and the light emitting diode 201a can be disposed on the electrode 201b. Further, the reflector 202 and the dam 221 can be fixed to the substrate 210 by adhesive tapes 202a and 221a, respectively.

The light of the first path PS1 is caused to pass through the light conversion sheet 216 and the diffuser plate 217 to be then transmitted to the phosphor film 219, so that the light can be emitted out as white light from the phosphor film 219. Then, the light of the second path PS2 and the third path PS3 is caused to be reflected by the light conversion sheet 216 and the reflector 202 and further proceed alongside the backlight unit 200. Then, as the dam 221 coated with the reflective film is disposed around the backlight unit 200, the light travelling in the second path PS2 and the third path PS3 can be reflected off the dam 221 to further travel towards the phosphor film 219.

The light emitting device 201 emits blue light so that the blue light can be more concentrated onto the rim part of the backlight unit 200, (i.e., the bezel area BA in the light emitting unit 250) due to the light of the second path PS2 and the third path PS3. Accordingly, the bezel area BA in the light emitting unit 250 can be irradiated with more blue light than the display area DA. Then, as shown in FIG. 5, stronger blue light is represented in the bezel area BA than in the display area DA. Thus, bluish-colored, so-called "mura" appearing like a band can be displayed in a strip area from a boundary area between the bezel area BA and the display area DA up to part of the display area DA.

The boundary between the bezel area BA and the display area DA can become vague due to occurrence of such bluish-colored mura. Further, the bluish-colored band can be perceived as dark visually to a viewer, and thus there can often arise a problem of deteriorated luminance uniformity in the backlight unit 200. Typically, it might be possible to make such a mura not perceivable by a viewer, by means of having the bezel 600 of the display device 10 cover up the portion where the mura appears. However, since the bezel area BA has to be enough widened to cover up the mura, there can very often arise a problem that the narrow bezel 600 cannot be actually adapted to the display device 10.

However, the occurrence of mura can be suppressed by disposing the first reflective film 218a and the second reflective film 218b on the rim of the phosphor film 219. As the light in the second path PS2 is of blue light, it is reflected by the first reflective film 218a that is adapted to only reflect blue light. At this point, part of the light in the second path PS2 can be transmitted through the first reflective film 218a, wherein the light passing through the first reflective film 218a of the light in the second path PS2 is indicated by a dotted line. Thus, the light of the second path PS2 does not proceed any further to the phosphor film 219, so that the component of blue light in the bezel area BA can be reduced. Then, although the light of the third path PS3 is also blue light, the second reflective film 218b only reflects red and green light, so the light of the third path PS3 is then delivered to the phosphor film 219 through the second reflective film 218b. Part of the light of the third path PS3 can be reflected by the second reflective film 218b. Here, the light reflected from the second reflective film 218b of the light in the third path PS3 is indicated by a dotted line. At this time, as shown in FIG. 6, part of the red light R2 and the green light G2 among the red light R1 and R2 and the green light G1 and G2 emitted from the phosphor film 219 proceeds towards the second direction B.

Some of the red light R2 and the green light G2 traveling in the second direction B can be reflected by the second reflective film 218b, and then, proceed again towards the first direction A. Owing to this reflection, the component of the red light and the component of the green light can be increased in the bezel area BA.

Such a decrease in blue light and an increase in red light and green light in the bezel area BA makes it possible to suppress the occurrence of blue mura in a boundary area between the bezel area BA and the display area DA. Therefore, as illustrated in FIG. 7, it is possible to make a clear distinguishing of the boundary between the bezel area BA and the display area DA. Then, as the bezel 600 is allowed to only cover up the boundary between the bezel area BA and the display area DA, it is possible to provide the display device 10 in which the narrow bezel is implemented.

In addition, when the second reflective film 218b is disposed to invade the display area DA, then being disposed in part of the display area DA, it has been confirmed that a bright line appeared at the boundary area as shown in (a) of FIG. 8, although it might be managed to improve the mura in the bezel area BA and the display area DA. However, when the second reflective film 218b is disposed so as not to invade the display area DA, it has been confirmed that no bright line appeared at the boundary area, as shown in (b) of FIG. 8.

Accordingly, the first reflective film 218a and the second reflective film 218b can be disposed only inside the bezel area BA. That is, the second reflective film 218b can be covered up by the bezel 600. In addition, the end of the second reflective film 218b can be disposed inside the bezel area BA, which is located at an inner side of the phosphor film 219 than the end of the bezel 600. Preferably, the end of the second reflective film 218b can be disposed with about 1 mm of difference in width from the end of the bezel 600. Since the light emitted from the backlight unit 200 before passing through the display panel has a higher color temperature than typical white light, the white light passing through the conversion sheet 216 and the phosphor film 219 according to the embodiments of the present disclosure as shown in FIGS. 5, 7 and 8 can be recognized as a bluish color.

Figure 9:
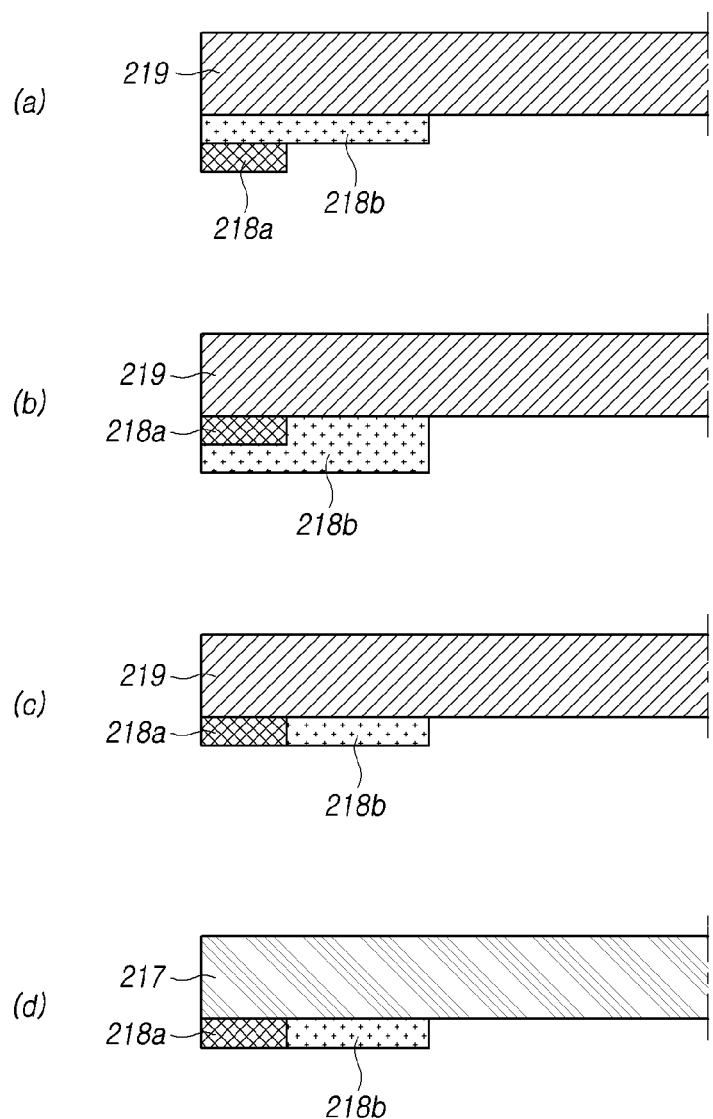
FIG. 9 is a conceptual diagram showing the arrangement and shapes of the first and second reflective films according to embodiments of the present disclosure.

FIG. 9 is a conceptual diagram showing the arrangement and shapes of the first and second reflective films according to embodiments of the present disclosure.

Referring to FIG. 9, as illustrated in (a) and (b) thereof, the first reflective film 218a and the second reflective film 218b can be disposed underneath the phosphor film 219, and the first reflective film 218a can be disposed underneath the second reflective film 218b or, on or above the second reflective film 218b in some cases. Preferably, the first reflective film 218a can be disposed underneath the second reflective film 218b, as shown in (a). Further, as shown in (b), the first reflective film 218a can be disposed between the phosphor film 219 and the second reflective film 218b. In addition, as the width of the second reflective film 218b is wider than that of the first reflective film 218a, the first reflective film 218a can be disposed to overlap part of the second reflective film 218b. Furthermore, the first reflective film 218a and the second reflective film 218b can be disposed between the diffuser plate 217 and the phosphor film 219. In addition, as illustrated in (c) and (d) of FIG. 9, the first reflective film 218a and the second reflective film 218b can be disposed underneath the phosphor film 219 or underneath the diffuser plate 217 as circumstances require. Furthermore, although not illustrated in FIG. 9, the first reflective film 218a and the second reflective film 218b can be disposed on or above the phosphor film 219.

Additionally, the first reflective film 218a and the second reflective film 218b can be disposed on the optical sheet 220 disposed on the phosphor film 219, and the first reflective film 218a and the second reflective film 218b can be disposed on the same layer in some cases. The first reflective film 218a and the second reflective film 218b can be disposed between the light conversion sheet 216 and the diffuser plate 217.

Further, the first reflective film 218a can be disposed on the outermost side, while the second reflective film 218b can be disposed on the inner side of the first reflective film 218a. Referring again to (c) and (d) of FIG. 9, the thicknesses of the first reflective film 218a and the second reflective film 218b are shown to be the same, but they are not limited thereto.

FIGS. 10A to 10E are diagrams illustrating more specific structures of the backlight unit according to embodiments of the present disclosure.

Figure 10A:
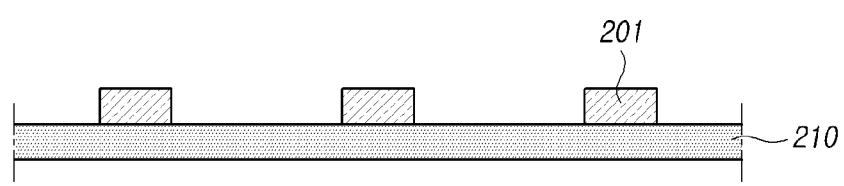
FIGS. 10A to 10E are diagrams illustrating more specific structures of the backlight unit according to embodiments of the present disclosure.

Referring first to FIG. 10A, a plurality of light emitting devices 201 can be disposed on the substrate 210. A coated reflective film can be disposed on the substrate 210, and a white pigment can be applied onto the substrate 210.

Figure 10B:
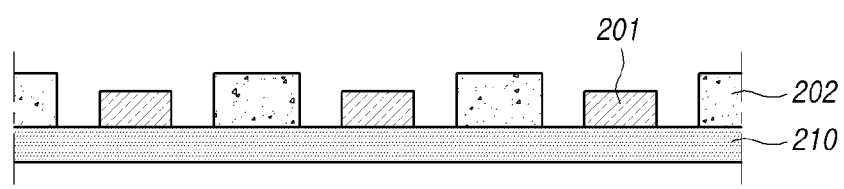

Referring then to FIG. 10B, at least one reflector 202 can be disposed on at least part of an area other than the area in which the light emitting devices 201 are disposed on the substrate 210.

This reflector 202 can be manufactured in such a manner that an area corresponding to the light emitting device 201 is opened, and then seated on the substrate 210. Further, the reflector 202 makes it possible to reflect the light emitted from the light emitting device 201 off the front surface of the backlight unit 200, thereby increasing the light efficiency of the backlight unit 200.

Here, in case where the light emitting device 201 is disposed in the form of a chip, the size of the light emitting device 201 becomes relatively small, so the height of the reflector 202 can be higher than that of the light emitting device 201. Thus, the light emitted from a side surface of the light emitting device 201 can be reflected off a side surface of the reflector 202 to be output via a front surface of the backlight unit 200, through which the light efficiency of the backlight unit 200 can be further enhanced.

Figure 10C:
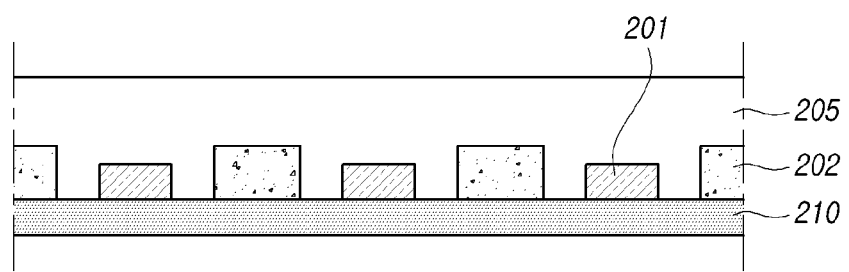

Referring then to FIG. 10C, a resin layer 205 can be disposed on the plurality of light emitting devices 201 and the reflectors 202, wherein the resin layer 205 can include resin. When the resin layer 205 is disposed, a partition wall can be disposed in the outside of the substrate 210 or on an outer portion of the area where the plurality of light emitting devices 201 are disposed on the substrate 210 and the resin can be coated inside the partition wall, so that the resin layer 205 can be disposed on the plurality of light emitting devices 201 and the reflectors 202.

The resin layer 205 serves to protect the plurality of light emitting devices 201 disposed on the substrate 210, and can provide a function of a light guide plate by causing diffusion of the light emitted from the light emitting devices 201. Thus, the light emitted from the light emitting device 201 by the resin layer 205 is allowed to be spread over the upper surface of the resin layer 205 as more evenly as possible. At this point, even though an adjustment can be made to the direction in which the light spreads throughout the resin layer 205 by the reflector 202, the intensity of light output from the resin layer 205 to an area corresponding to the vertical direction of the light emitting device 201 can be larger than that of the light output to any other areas. Thus, this difference in the light intensity can result in occurrence of mura, thereby making luminance uniformity in the backlight unit 200 deteriorate.

According to the embodiments of the present disclosure, it is possible to improve the luminance uniformity of displayed images while reducing the thickness of the backlight unit 200, by allowing the light conversion sheet 216 with optical characteristics to be disposed in the position corresponding to the light emitting device 201 on the resin layer 205.

Figure 10D:
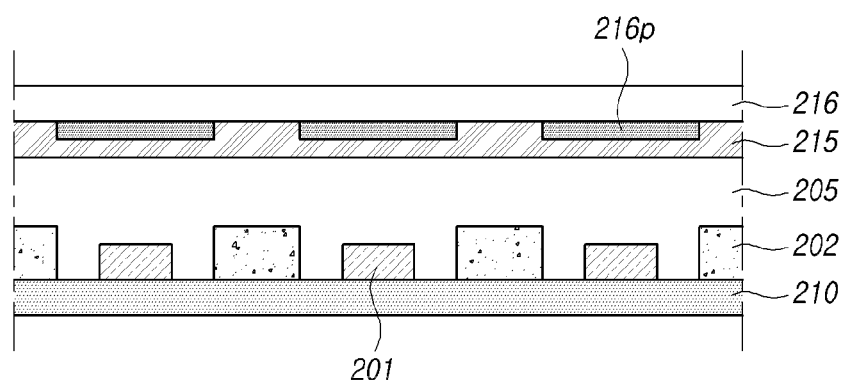

Referring now to FIG. 10D, the light conversion sheet 216 can be disposed above the resin layer 205, and the light conversion sheet 216 can include a plurality of light conversion patterns 216p disposed on its bottom surface, although these light conversion patterns 216p can be disposed on an uppermost surface of the light conversion sheet 216. Then, the light conversion sheet 216 can be attached to the resin layer 205 by means of an adhesive film 215. The adhesive film 215 can be an optical clear adhesive (OCA) film. Further, the light conversion sheet 216 can be formed of, for example, PET or the like, although not limited thereto.

Each of the plurality of light conversion patterns 216p disposed on the bottom surface of the light conversion sheet 216 can be arranged in a position corresponding to each of the plurality of light emitting devices 201 disposed on the substrate 210. For example, at least a portion of the light conversion pattern 216p can be disposed to overlap the light emitting device 201. As such, when considering the diffusion characteristics of light, the light conversion pattern 216p can be disposed to overlap an area including the area where the light emitting device 201 is disposed. The light conversion pattern 216p allows the light emitted from the light emitting device 201 to undergo scattering, reflection, diffraction, and/or transmission. For example, the light conversion pattern 216p can cause scattering of the light emitted from the light emitting device 201, so as to output the light. Then, it is possible to have the light emitted in the vertical direction from the light emitting device 201 reflected once and then, reflected again by the reflector 202, so that the light can be directed onto an area between the light emitting devices 201.

As apparent from the above description, the light emitted from the light emitting device 201 is caused to undergo scattering, reflection, diffraction and/or transmission by the light conversion pattern 216p, so that the luminance uniformity of the backlight unit 200 can be significantly improved.

Figure 10E:
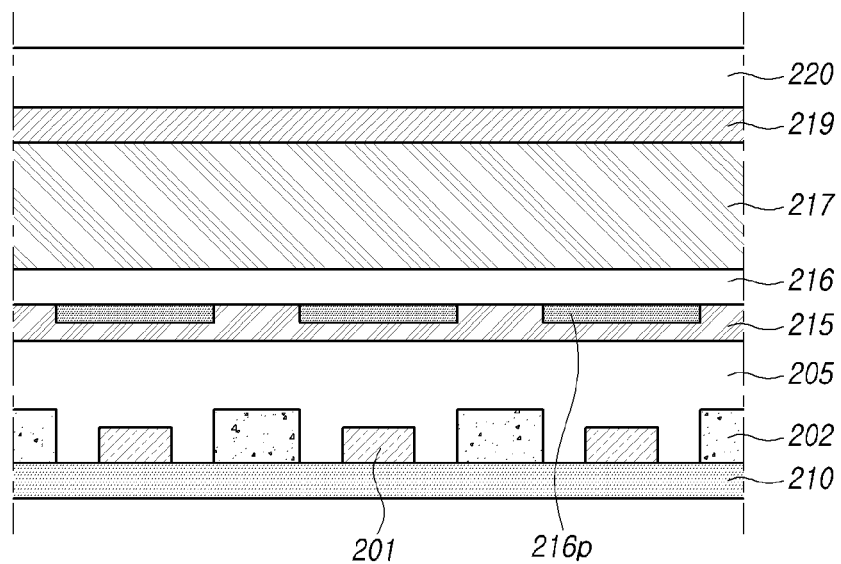

Referring then to FIG. 10E, the diffuser plate 217 can be disposed on the light conversion sheet 216, and the phosphor film 219 can be disposed on the diffuser plate 217. Further, one or more optical sheets 220 can be disposed on the phosphor film 219. Here, the diffuser plate 217 and the phosphor film 219 can be positioned interchangeably with each other.

The diffuser plate 217 can cause diffusion of the light emitted through the light conversion sheet 216. The phosphor film 219 can include a phosphor material with a specific color, and can cause excitation of the incident light to emit light in a specific wavelength band. For this reason, the light passing through the phosphor film 219 can be of a specific color included in the phosphor film 219 or a color mixed with the specific color. As an example, when the light emitting device 201 emits blue light, the phosphor film 219 can react to the incident light to generate therefrom green light and/or red light.

Further, the phosphor film 219 can be disposed in some area on the diffuser plate 217 as circumstances require. For example, when the light emitting device 201 is adapted to give off the blue light, the phosphor film 219 can be disposed only in some area except for a surface region corresponding to the area in which the blue subpixel 101 is disposed in the display panel 100. That is, an arrangement can be made so that the light that has not passed through the phosphor film 219 reaches the blue sub-pixel 101 of the display panel 100.

As described above, the backlight unit 200 is configured to include the light conversion sheet 216 having the light conversion patterns 216p disposed in the position corresponding to the light emitting device 201, and other various optical elements, thereby making it possible to improve the luminance uniformity of the light presented by the backlight unit 200 while implementing a reduced thickness of the backlight unit 200.

Hereinafter, the embodiments of the present disclosure will be further described together with a specific example of the light conversion pattern 216p disposed on the light conversion sheet 216.

Figure 11:
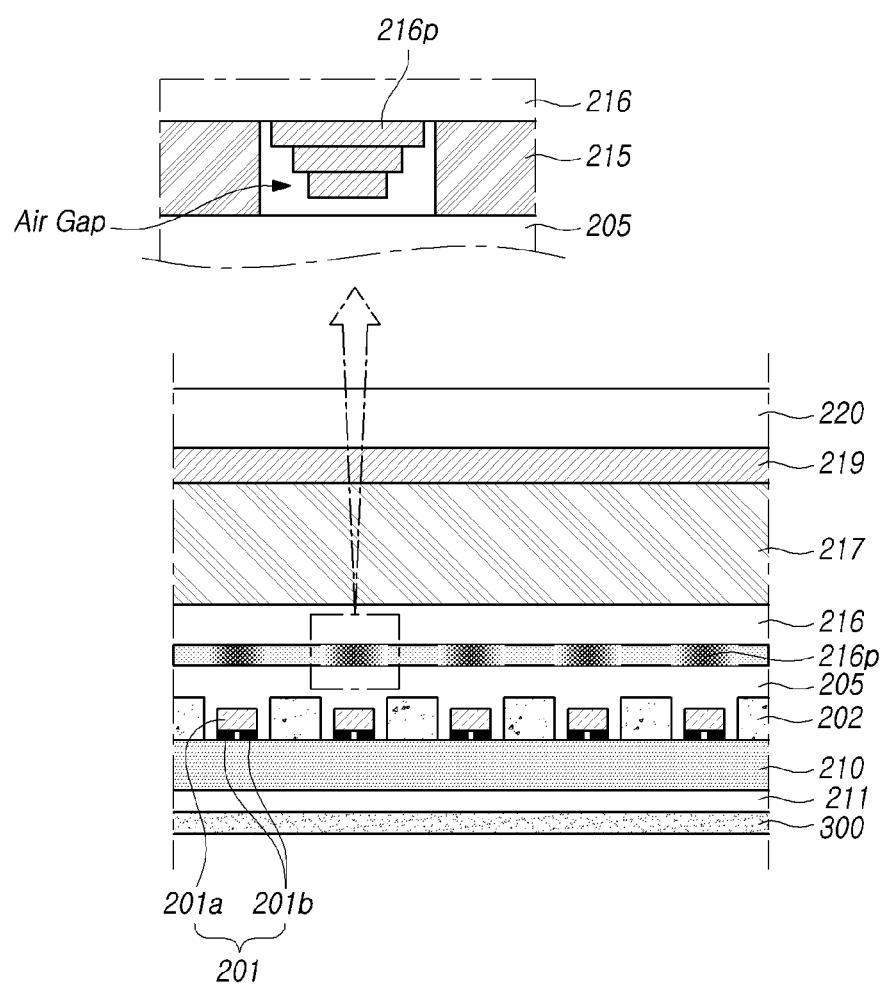
FIG. 11 is a view showing the structure of the backlight unit according to embodiments of the present disclosure.

FIG. 11 illustrates the structure of the backlight unit according to the embodiments of the present disclosure.

Referring now to FIG. 11, a substrate 210 can be disposed on a cover bottom 300. The cover bottom 300 can be fixed onto the substrate 210 by means of an adhesive tape 211 disposed between the substrate 210 and the cover bottom 300. However, it is to be noted that the present disclosure is not limited thereto, and the cover bottom 300 can be fixed to the substrate 210 by means of a screw.

A plurality of light emitting devices 201 can be disposed on the substrate 210, and at least one reflector 202 can be disposed in at least some area other than the area in which the light emitting devices 201 are disposed.

Here, the light emitting device 201 can include, for example, a light emitting diode (LED), which can further include a light emitting diode 201a having an n-type semiconductor layer, an activation layer and a p-type semiconductor layer, and an electrode section 201b supplying a voltage to the light emitting diode 201a. A resin layer 205 can be disposed on the plurality of light emitting devices 201 and the reflectors 202. A light conversion sheet 216 can be disposed on the resin layer 205, with light conversion patterns 216p disposed in a position corresponding to each of the light emitting devices 201. Further, on the light conversion sheet 216 can be disposed a diffuser plate 217, a phosphor film 219, and an optical sheet 220 in sequence.

The light conversion pattern 216p disposed on the bottom surface of the light conversion sheet 216 can be implemented by making it printed with specific ink having light conversion characteristics on the light conversion sheet 216, preferably, for example, coating the light conversion pattern 216p using a method of printing a certain pattern with ink inclusive of TiO2 on the light conversion sheet 216. Further, the light conversion pattern 216p disposed on the bottom surface of the light conversion sheet 216 can be formed either in one layer or in a multi-layer structure. As shown in FIG. 11, the light conversion pattern 216p disposed on the bottom surface of the light conversion sheet 216 can be formed of e.g., three layers, although it is not limited thereto. Thus, the light conversion pattern 216p can be efficiently implemented using the method of printing the light conversion material at least three times on the light conversion sheet 216.

Meanwhile, since the intensity of light emitted from the light emitting device 201 has the largest in its vertical direction, the central portion of the light conversion pattern 216p can be formed with thicker depth than any other peripheral portion thereof. That is to say, the area of the printed light conversion material can be formed to have less area (i.e., narrower) as it goes further to a next printing sequence, although not limited thereto. Thus, the area of the light conversion pattern 216p can be formed narrower as it goes further downwards from the light conversion sheet 216, and thus, the thickness in the central portion of the light conversion pattern 216p can be greater than that in its outer portion. Further, the light conversion sheet 216 provided with the light conversion patterns 216p can be disposed in such a manner that the light conversion patterns 216p are adjacent to the resin layer 205.

With the light conversion pattern 216p disposed over the light emitting device 201, it makes it possible to block the light emitted in a vertical direction from the light emitting device 201, thereby preventing formation of a hot spot in an area in which the light emitting devices 201 of the backlight unit 200 are disposed. The light conversion sheet 216 provided thereon with the light conversion pattern 216p can be bonded to the resin layer 205 by means of an adhesive film 215. Here, the adhesive film 215 can be disposed on at least some of an area other than the area where the light conversion pattern 216p is disposed, on the bottom surface of the light conversion sheet 216.

Then, the adhesive film 215 may not be disposed in the area where the light conversion pattern 216p is disposed, and an air gap can exist in between the light conversion pattern 216p and the resin layer 205. Further, the sides of the light conversion patterns 216p can be respectively arranged to be spaced apart from the adhesive film 215. As the air gap exists between the light conversion pattern 216p and the resin layer 205, the light emitted in the lateral direction of the light conversion pattern 216p can be reflected by the air gap. That is to say, the light emitted in the lateral direction of the light conversion pattern 216p can be output at a large refractive angle by the air gap having a low refractive index or be reflected off the air gap. Then, the light reflected off the air gap is caused to undergo reflection again by the reflector 202 before it is output from the backlight unit, thereby further increasing the light efficiency of the backlight unit, while assisting the light conversion function of the light conversion pattern 216p.

As described above, it is possible to increase the light efficiency of the backlight unit while preventing formation of the hot spots, owing to the structure of arranging the light conversion pattern 216p and the air gap in the position corresponding to the light emitting device 201. Meanwhile, the light conversion patterns 216p disposed underneath the light conversion sheet 216 can be arranged in a different structure according to their positions.

Figure 12A:
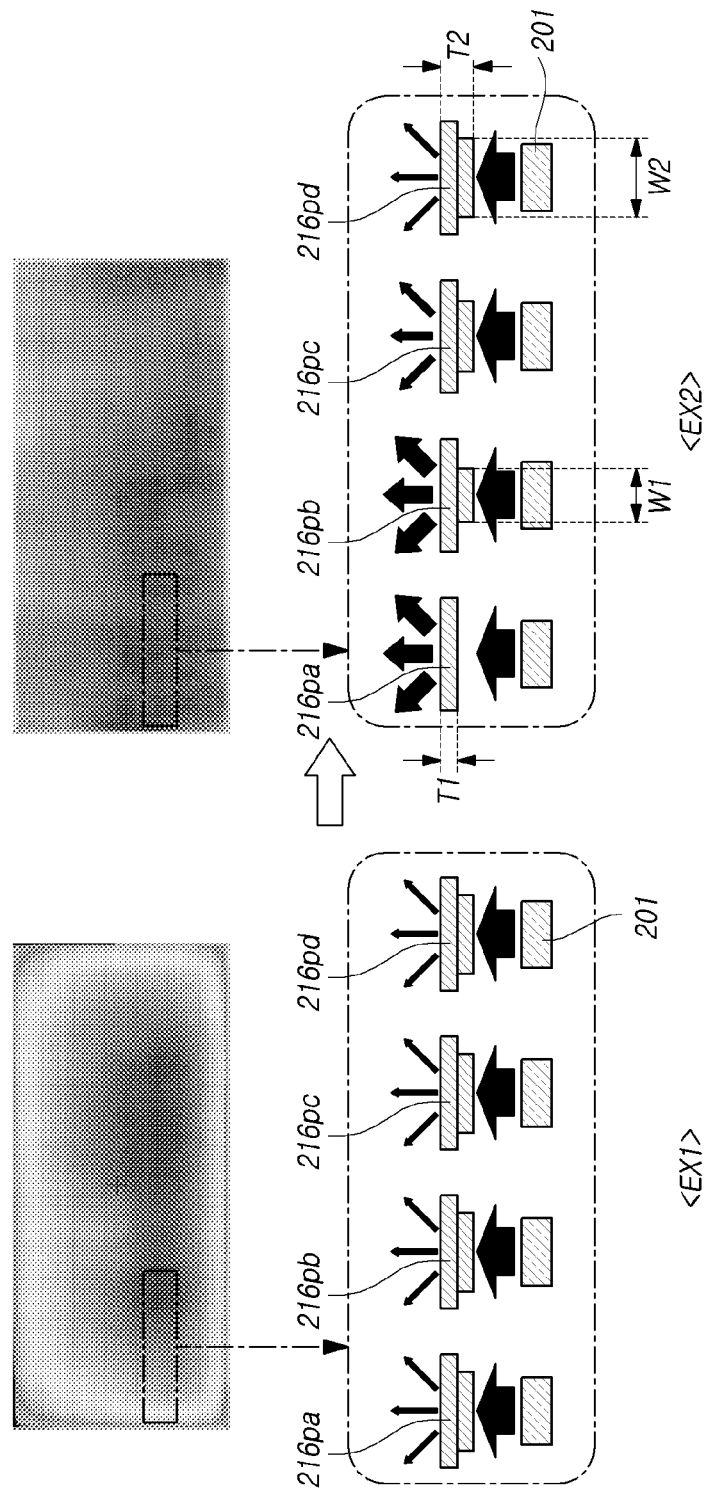
FIGS. 12A and 12B are views illustrating an example of a structure according to the position of the light conversion patterns included in the backlight unit shown in FIG. 11.
Figure 12B:
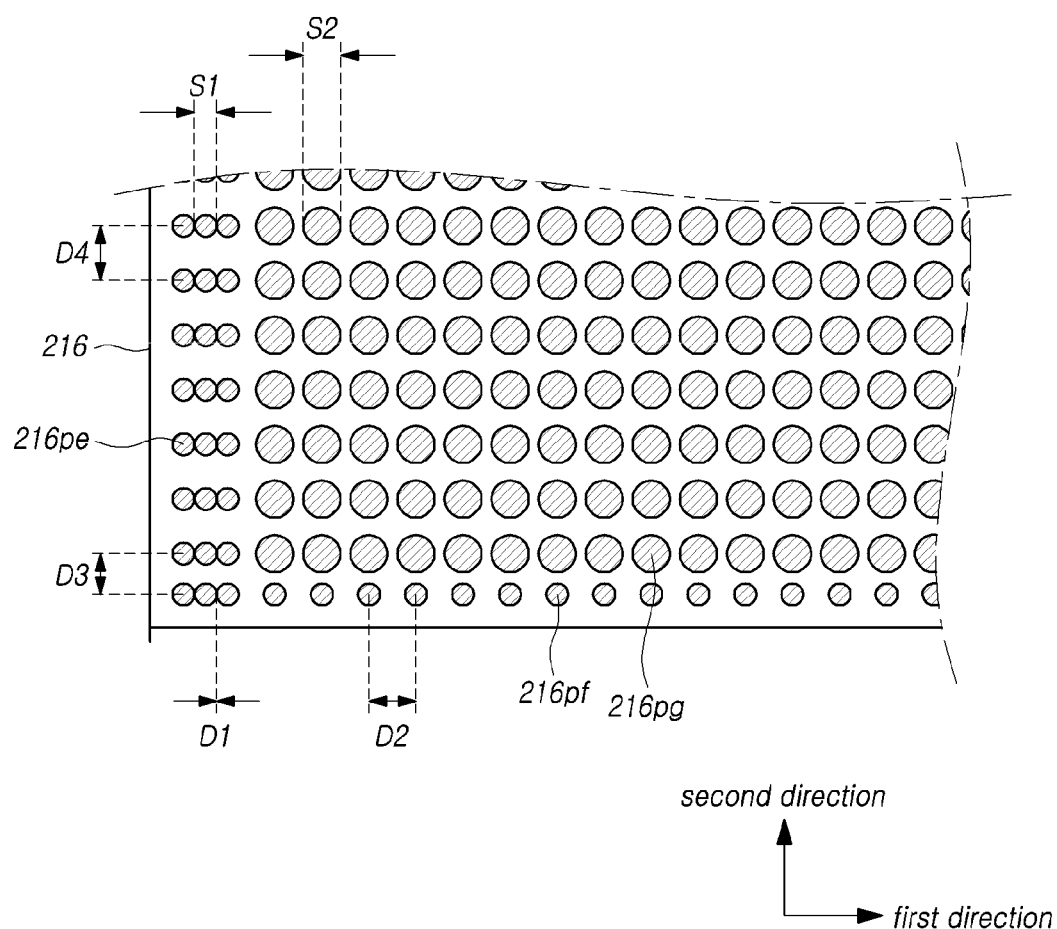

FIGS. 12A and 12B each illustrate an example of the structure according to the arranged positions of the light conversion patterns included in the backlight unit as illustrated in FIG. 11.

Referring then to FIG. 12B illustrating an example of the luminance represented in the backlight unit 200 according to the structure of the light conversion pattern, it is seen that the example <EX1> represents the luminance measured when the light conversion pattern 216ps are arranged in a regular pattern of structure, whereas the example <EX2> represents the luminance measured when the light conversion patterns 216p are arranged in a different pattern of structure according to their positions.

As seen in the example <EX1> of FIG. 12A, the luminance in the outer area of the backlight unit 200 can appear lower, when the light conversion pattern 216pa disposed in the outer area of the backlight unit 200 and the light conversion pattern 216pd disposed in the central area are substantially the same as each other in their structures.

In other words, as the number of the light emitting devices 201 supplying light to the outer area of the backlight unit 200 is relatively smaller, the luminance in the outer area of the backlight unit 200 can be lower than that of the central area of the backlight unit 200 in case where their light conversion patterns 216p have the same level of light conversion characteristics.

Therefore, as seen in the example <EX2> of FIG. 12A, by having the light conversion pattern 216pa in the outer area of the backlight unit 200 arranged in a different structure from the light conversion pattern 216pd in the central area thereof, it is possible to prevent the luminance in the outer area of the backlight unit 200 from deteriorating and thus, make its overall luminance uniform.

As an example, the light conversion patterns 216p can be arranged so that the thickness T1 of the light conversion pattern 216pa disposed in the outer area of the backlight unit 200 is smaller than the thickness T2 of the light conversion pattern 216pd disposed in its central area.

Alternatively, the light conversion patterns 216p can be arranged so that the area W1 of the thickest portion in the light conversion pattern 216pb is smaller than the area W2 of the thickest portion in the light conversion pattern 216pd. In other words, the light conversion patterns 216p can be arranged so that a portion having higher blocking characteristics in the light conversion patterns 216pa and 216pb disposed in the outer area of the backlight unit 200 or an area adjacent to the outer area has a smaller area.

Further, the light conversion patterns 216p can be arranged so that as it goes further from the center area to the outer area of the backlight unit 200, the thickness of the light conversion pattern 216p or the area of the thickest portion in the light conversion pattern 216p gradually decreases.

Furthermore, the arrangement can be made so that the distance between light emitting devices 201 or the number of the light emitting devices 201 in the central area and the outer area of the backlight unit 200 can be different from each other as circumstances require, and thus, the light conversion patterns 216p can be arranged in a different pattern from each other.

Referring then to FIG. 12B, it is shown another example of the structure in which the light conversion patterns 216p are disposed on a bottom surface of the light conversion sheet 216.

Here, the distance between the light emitting devices 201 disposed in the outer area of the backlight unit 200 can be narrower than the distance between the light emitting devices 201 disposed in the central area of the backlight unit 200. That is to say, the light emitting devices 201 can be arranged in a more dense structure for the outer area of the backlight unit 200, so that the luminance in both the central area and the outer area of the backlight unit 200 becomes uniform.

Then, as the light conversion patterns 216p disposed on the bottom surface of the light conversion sheet 216 are arranged in the position corresponding to the light emitting device 201, the distance between the light conversion patterns 216p disposed in the outer area of the backlight unit 200 can be different from that between the light conversion patterns 216p disposed in the central area thereof.

As an example, the distance D1 in the first direction of the light conversion patterns 216p disposed in the outer area of the backlight unit 200 can be smaller than the distance D2 in the first direction of the light conversion patterns 216p disposed in the central area thereof. Further, the distance D3 in the second direction of the light conversion patterns 216p disposed in the outer area of the backlight unit 200 can be smaller than the distance D4 in the second direction of the light conversion patterns 216p disposed in the central area thereof.

Here, the size and the thickness of the light conversion patterns 216p disposed in the outer area of the backlight unit 200 can be different from those of the light conversion pattern 216p disposed in the central area of the backlight unit 200.

For example, as illustrated in FIG. 12B, the size S1 of the light conversion patterns 216pe and 216pf disposed in the outer area of the backlight unit 200 can be smaller than the size S2 of the light conversion pattern 216pg disposed in the central area of the backlight unit.

Alternatively, the light conversion patterns 216p can have a multi-layer structure as described above, wherein the thickness of the light conversion patterns 216pe and 216pf disposed in the outer area of the backlight unit 200 or the area of its thickest section can be smaller than the thickness of the light conversion pattern 216pg disposed in the central area of the backlight unit 200 or the area of its thickest section.

In other words, it is possible to arrange the light conversion patterns 216pe and 216pf in line with the light emitting devices 201 disposed in a narrower distance, by making smaller the size of the light conversion patterns 216pe and 216pf disposed in the outer area of the backlight unit 200. Therefore, it makes it possible to prevent formation of a hot spot at any position corresponding to the light emitting devices 201 in the outer area of the backlight unit 200.

Moreover, the light conversion pattern 216p makes it possible to reduce a blocked level of the light emitted from the light emitting device 201 in the outer area of the backlight unit 200, thereby increasing the amount of light emission and thus preventing the luminance in the outer area of the backlight unit 200 from deteriorating, thus enabling an entire area of the backlight unit 200 to be represented in more uniform luminance.

As described above, it is possible to prevent the luminance from deteriorating in the outer area of the backlight unit 200 so as to greatly improve the luminance uniformity, by arranging the structure of the light conversion pattern 216p with a different pattern for each corresponding area of the backlight unit 200.

Furthermore, it is possible to prevent occurrence of a hot spot in the backlight unit 200 and improve its luminance uniformity, using the particular arrangement structure of the light conversion patterns 216p as described above.

As a result, according to the embodiments of the present disclosure, it is possible to improve the luminance uniformity in the backlight unit (e.g., the backlight unit 200) and thus provide a solution to enhance the light efficiency, by causing the light emitted upwards in the vertical direction of the light emitting device (e.g., the light emitting device 201) to undergo diffraction through the light conversion patterns (e.g., the light conversion patterns 216p).

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A backlight unit comprising:
a light emitting unit configured to irradiate light in a first wavelength band;
a phosphor film excited by the light in the first wavelength band irradiated from the light emitting unit to emit the light in the first wavelength band, a second wavelength band and a third wavelength band;
a first reflective film disposed in a position corresponding to a rim of the phosphor film, and configured to reflect the light in the first wavelength band;

a second reflective film disposed adjacent to the first reflective film, and configured to reflect the light in the second and third wavelength bands; and a dam disposed around the light emitting unit, wherein the light emitting unit further comprises:
  a plurality of light emitting devices disposed on a substrate;
  at least one reflector disposed on a partial area of the substrate between the plurality of light emitting devices; and
  a resin layer disposed on the plurality of light emitting devices and the at least one reflector.

2. The backlight unit according to claim 1, further comprising:
  a light conversion sheet disposed on the resin layer; and
  a diffuser plate disposed on the light conversion sheet,
  wherein the phosphor film is disposed on the light conversion sheet.

3. The backlight unit according to claim 2, wherein the first reflective film and the second reflective film are disposed between the diffuser plate and the phosphor film.

4. The backlight unit according to claim 2, wherein the first reflective film and the second reflective film are disposed between the light conversion sheet and the diffuser plate.

5. The backlight unit according to claim 2, wherein each of the first reflective film and the second reflective film includes a structure in which a plurality of thin films having different refractive indices are stacked, and
  thicknesses of the first reflective film and the second reflective film are different from each other.

6. The backlight unit according to claim 2, wherein the light conversion sheet includes a plurality of light conversion patterns each disposed in a position corresponding to each of the plurality of light emitting devices, and
  each of the plurality of light conversion patterns has a larger thickness in its central portion than its outer portion.

7. A backlight unit comprising:
  a light emitting unit configured to irradiate light in a first wavelength band;
  a phosphor film excited by the light in the first wavelength band irradiated from the light emitting unit to emit the light in the first wavelength band, a second wavelength band and a third wavelength band;
  a first reflective film disposed in a position corresponding to a rim of the phosphor film, and configured to reflect the light in the first wavelength band;
  a second reflective film disposed adjacent to the first reflective film, the second reflective and configured to reflect the light in the second and third wavelength bands; and
  a dam disposed around the light emitting unit,
  wherein the dam is coated with a reflective film.

8. A display device comprising:
  a display panel; and
  a backlight unit configured to irradiate light onto the display panel, the backlight unit comprising:
    at least one light emitting unit configured to emit light in a first wavelength band;
    a phosphor film being excited by the light in the first wavelength band emitted from the at least one light emitting unit to emit the light in the first wavelength band, a second wavelength band and a third wavelength band;
    a first reflective film disposed in a position corresponding to a rim of the at least one light emitting unit, the first reflective film being configured to reflect the light in the first wavelength band;
    a second reflective film disposed adjacent to the first reflective film, the second reflective film being configured to reflect the light in the second and third wavelength bands; and
    a dam disposed around the at least one light emitting unit,
    wherein the at least one light emitting unit further comprises:
      a plurality of light emitting: devices disposed on a substrate;
      at least one reflector disposed on a partial area of the substrate between the plurality of light emitting devices; and
      a resin layer disposed on the plurality of light emitting devices and the at least one reflector.

9. The display device according to claim 8, further comprising:
  a light conversion sheet disposed on the resin layer; and
  a diffuser plate disposed on the light conversion sheet,
  wherein the phosphor film is disposed on the light conversion sheet.

10. The display device according to claim 8, wherein the first reflective film and the second reflective film are disposed between the diffuser plate and the phosphor film.

11. The display device according to claim 8, wherein the first reflective film and the second reflective film are disposed between the light conversion sheet and the diffuser plate.

12. The display device according to claim 8, wherein each of the first reflective film and the second reflective film includes a structure in which a plurality of thin films having different refractive indices are stacked, and
  thicknesses of the first reflective film and the second reflective film are different from each other.

13. The display device according to claim 11, wherein the light conversion sheet includes a plurality of light conversion patterns each disposed in a position corresponding to each of the plurality of light emitting devices, and
  each of the plurality of light conversion patterns has a larger thickness in its central portion than its outer portion.

14. The display device according to claim 8, wherein the dam is coated with a reflective film.

15. The display device according to claim 8, further comprising a bezel disposed to cover a bezel area corresponding to a rim of the display panel,
  wherein one end of the second reflective film is disposed in an inner side of the bezel area than one end of the bezel.

* * * * *